US009745522B2

(12) United States Patent
Osawaru et al.

(10) Patent No.: US 9,745,522 B2
(45) Date of Patent: Aug. 29, 2017

(54) METHOD OF OBTAINING PARAFFINIC HYDROCARBONS FROM NATURAL FAT

(71) Applicant: INSTYTUT CHEMII PRZEMYSLOWEJ, Warsaw (PL)

(72) Inventors: Osazuwa Osawaru, Warsaw (PL); Jacek Kijenski, Warsaw (PL); Ewa Smigiera, Warsaw (PL); Anna Zgudka, Warsaw (PL); Antoni Migdal, Warsaw (PL); Monika Nemtusiak, Warsaw (PL); Andrzrj Kawalec, Krasnobrod (PL); Iwona Rasinska, Jablonna (PL)

(73) Assignee: INSTYTUT CHEMII PRZEMYSLOWEJ, Warsaw (PL)

( * ) Notice: Subject to any disclaimer, the term of this patent is extended or adjusted under 35 U.S.C. 154(b) by 165 days.

(21) Appl. No.: 14/646,910

(22) PCT Filed: Nov. 18, 2013

(86) PCT No.: PCT/PL2013/000147
§ 371 (c)(1),
(2) Date: May 22, 2015

(87) PCT Pub. No.: WO2014/081321
PCT Pub. Date: May 30, 2014

(65) Prior Publication Data
US 2015/0291891 A1 Oct. 15, 2015

(30) Foreign Application Priority Data
Nov. 26, 2012 (PL) .......................................... 401772

(51) Int. Cl.
*C10G 45/00* (2006.01)
*C01B 3/22* (2006.01)
(Continued)

(52) U.S. Cl.
CPC ................ *C10G 45/00* (2013.01); *C01B 3/22* (2013.01); *C10G 3/45* (2013.01); *C10G 3/46* (2013.01);
(Continued)

(58) Field of Classification Search
CPC ...... C01B 2203/0277; C01B 2203/062; C01B 2203/1052; C01B 2203/1082;
(Continued)

(56) References Cited

U.S. PATENT DOCUMENTS 3,130,240 A * 4/1964 Stark ...................... B01J 23/755
208/143
5,336,440 A 8/1994 Kiyoura et al.
(Continued)

FOREIGN PATENT DOCUMENTS

FR 2917424 A1 12/2008
GB 1524781 A 9/1978
WO 200904180 A2 1/2009

OTHER PUBLICATIONS

International Search Report for App. No. PCT/PL2013/000147 dated May 27, 2014.

*Primary Examiner* — Sharon Pregler
(74) *Attorney, Agent, or Firm* — Walker & Jocke (57) ABSTRACT

A method of obtaining paraffinic hydrocarbons from fat, by an exemplary method, whereby the method is performed in two stages, in a coupled flow-type system, under atmospheric pressure conditions, in the presence of heterogeneous catalysts, after their thermal activation, so that in Stage I the fat and/or waste fat is heated at a temperature range of 100-500° C., in the presence of an inert gas, in the presence of a catalyst in the form of a metal oxide on an oxide support or in the form of a mixture of at least two metal oxides on an oxide support. The product obtained in Stage I is treated, in the presence of an inert gas, at a
(Continued)

temperature range of 100-500° C., in the presence of a metallic catalyst on an oxide support, with hydrogen gas or with a mixture of hydrogen and carbon monoxide, obtained in the selective decomposition of methanol.

16 Claims, 2 Drawing Sheets

(51) Int. Cl.
    *C11C 3/00* (2006.01)
    *C11C 3/12* (2006.01)
    *C10G 3/00* (2006.01)

(52) U.S. Cl.
    CPC ............... *C11C 3/00* (2013.01); *C11C 3/123* (2013.01); *C11C 3/126* (2013.01); *C01B 2203/0277* (2013.01); *C01B 2203/062* (2013.01); *C01B 2203/1052* (2013.01); *C01B 2203/1082* (2013.01); *C01B 2203/1223* (2013.01); *Y02P 30/20* (2015.11)

(58) Field of Classification Search
CPC ..... C01B 2203/1223; C01B 3/22; C10G 3/45; C10G 3/46; C10G 45/00; C11C 3/00; C11C 3/123; C11C 3/126
See application file for complete search history.

(56) References Cited

U.S. PATENT DOCUMENTS

| | | | |
|---|---|---|---|
| 5,904,880 A | * | 5/1999 | Sun .......................... B01J 23/02 252/373 |
| 9,365,776 B2 | * | 6/2016 | Venderbosch ......... B01J 23/002 |
| 2006/0161032 A1 | | 7/2006 | Murzin et al. |
| 2007/0135669 A1 | | 6/2007 | Koivusalmi et al. |

* cited by examiner

METHOD OF OBTAINING PARAFFINIC HYDROCARBONS FROM NATURAL FAT

TECHNICAL FIELD

An exemplary embodiment relates to a method of obtaining paraffinic hydrocarbons from natural fat, specifically, from waste vegetable oils, animal fat or algal oils.

BACKGROUND

The high cost involved in the mining and processing of fossil fuels, their depleting resources, and the limited global reserves of crude oil has caused greater interest in renewable resources. Most commonly, the fuels obtained from renewable resources are ethanol from maize and sugar, as well as vegetable oils used as diesel fuel. In the area of diesel fuel obtained from renewable sources, there are two sub-areas: bio-diesel (fatty acid methyl esters), described for instance in: D. Srivivas, J. K. Satyarthi, Catal. Surv. Asia, 2011, 15, 145, E. F. Romalho et al., J. Therm. Anal. Calorim., 2011, 106, 825, C. L. Bianchi et al., Catal. Lett., 2010, 134, 179 and green diesel, i.e., green diesel fuel (paraffins obtained from the fatty acids present in vegetable oils and animal fat) which is known, for instance, from the U.S. Pat. No. 8,119,847. Methyl esters, mainly those of linear $C_{14}$ to $C_{22}$ carboxylic acids, may be used as fuel directly or mixed with diesel fuel from crude oil refining. The use of fatty acid methyl esters as diesel fuel requires costly modifications of diesel engines and of injectors. The use of biodiesel increases operating costs because of its low lubricity, and winter weather conditions significantly limit its usability.

Taking into consideration the above-mentioned limitations in the use of biodiesel, alternative fuels are being sought. There is a potential for making green diesel (II and III generation biofuels) from renewable raw materials by converting fatty acids from triglycerides and/or free fatty acids originating from natural fat, especially waste vegetable oils, animal fat or algal oils to obtain linear aliphatic saturated hydrocarbons (paraffins). Green diesel has a high cetane number, which is necessary in maintaining the good performance of diesel engines (U.S. Pat. No. 8,119,847) and may be used as an independent fuel or mixed with diesel from crude oil. Its use does not require engine modifications and it can be processed in existing refineries adapted to the refining of crude oil.

Recently, various types of waste materials are regarded as a source of raw materials for making other higher-value products. Vegetable oils, animal fat and various kinds of waste edible fat are part of the waste classified in the Waste Catalogue (Polish Journal of Laws Dz. U No. 112 of 2001, Item 1206), principally, in Group 2. Such waste must be disposed of properly so as not to create any environmental hazard. Algae with high lipid content may be especially valuable (oil content in certain species is as high as above 80% of dry algal biomass) as it may constitute a raw material for third generation biofuels. The use of algae for energy has a huge potential because algae quickly adapt to growth conditions, may be grown both in fresh and sea water, and also because land is not required for production. Furthermore, due to the fact that two-thirds of the earth's surface is covered with water, algae will be a renewable source with a huge potential for the global energy needs.

A higher share of biocomponents in the market for liquid fuels, and liquid biofuels for use in transportation, is an important element of sustainable development, leading to an improved energy security by diversifying fuel supply sources and reducing dependence on petroleum imports while, in addition, having a positive impact on natural environment through appropriate waste management. According to forecasts, there will be a dynamic growth of the market for synthetic hydrocarbons obtained from biomass, as such will provide a substitute for petroleum in the future.

Two methods of obtaining paraffins from fatty acids are described predominantly in the literature: hydrodeoxygenation, HDO ($R-COOH+3H_2 \rightarrow R-CH_3+2H_2O$), and decarboxylation ($R-COOH \rightarrow R-H+CO_2$), for example in J-G. Na et al., Catal. Today, 2012, 185, 313. In HDO, oxygen in the form of water is removed from fatty acids (hydrogenolysis). Typical hydrorefining catalysts, such as Ni/Mo or Co/Mo, are used in the HDO process. The HDO method ensures the production of pure hydrocarbons, which are fully compatible with conventional fuels. However the process is energy-consuming because it requires the application of a high-pressure stream of hydrogen. It would be necessary to minimize the use of hydrogen for the process to be commercialized. The process of decarboxylation of fatty acids, with $CO_2$ removal from the molecule, is an alternative to HDO, though the hydrocarbons obtained are of one carbon atom less than in the molecule. In contrast to HDO, water is not produced in the decarboxylation process; this has a favorable effect, among others, on catalyst activity. On the other hand, both methods are conducted in batch systems at elevated pressures.

The U.S. Pat. No. 8,119,847 describes single-stage processing of vegetable oils and animal fat to paraffins by HDO in the presence of active metals and their mixtures (Ni, Co, Mo, W, Ni/Mo, Co/Mo), supported on graphite or oxides of aluminum and silicon, as well as zeolites (ZSM-5, ZSM-11, zeolite Y, mordenite, bata). The process was conducted in an autoclave at temperatures in the range of 250-450° C. and hydrogen pressures in the range of 3.4-17.2 MPa. Paraffins were obtained, with high selectivity, in which the ratios of odd to even-numbered carbon atoms in the hydrocarbon chain were 2:1.

M. Snare et al., Fuel, 2008, 87, 933 reported a method to obtain hydrocarbons from vegetable oils and animal fat over Pd/C at temperatures in the range 300-360° C. and at hydrogen pressures in the range 1.5-2.7 MPa. In addition to hydrocarbons, a significant amount of unreacted carboxylic acids was found in the product.

J-G. Na et al., Catal. Today, 2012, 185, 313 reported an innovative method to obtain paraffins in a decarboxylation reaction of fresh-water microalgae oil. The algal oil containing 36% triglycerides was initially subjected to pre-pyrolysis (600° C., 1 hr) to obtain a product for decarboxylation containing $C_{16}$ and $C_{18}$ free fatty acids, hydrocarbons and compounds containing pure heteroatoms of nitrogen or sulfur. Volatile acids, aldehydes, ketones and furane compounds obtained during the pyrolysis process were separated from the stream which was directed for the decarboxylation process. The decarboxylation process was carried out in an autoclave in a temperature range of 350-400° C. in the presence of hydrotalcites. $C_{15}$ and $C_{17}$ alkanes and also partly unreacted carboxylic acids were obtained mainly. The diesel fraction content was 35% after the first stage (pyrolysis) and 83.8% after decarboxylation.

Approaches to producing paraffinic hydrocarbons may benefit from improvements.

SUMMARY

Synthetic saturated aliphatic hydrocarbons (paraffins) are obtained with high efficiency from natural fat and/or waste fat, by a process according an exemplary method under atmospheric pressure conditions in a continuous manner in the presence of heterogeneous catalysts.

DETAILED DESCRIPTION

In an exemplary method to obtain paraffinic hydrocarbons from natural fat and/or waste fat is carried out, in a coupled flow system, under atmospheric pressure, at an elevated temperature, in the presence of an inert gas, and in the presence of heterogeneous catalysts. A double-stage process is carried out whereby raw waste fat, or any other natural fat, is thermally transformed under defined conditions (Fraction 1 is formed) in a first stage. Then the product obtained in the first stage is treated, in order to hydrogenate its olefin content, with hydrogen or with a mixture of hydrogen and carbon monoxide obtained in the selective decomposition of methanol (Fraction 2 is formed).

The fraction obtained in Stage I by the exemplary method (Fraction 1) may not be used directly as a biocomponent of fuels or as a biofuel because its hydrocarbons have a high degree of unsaturation. Therefore, it requires further treatment by hydrogenation of its olefins (Fraction 2).

The thermodynamic conditions of the exemplary process of hydrogenation of Fraction 1, conducted with the use of methanol as a hydrogen donor, are much milder, compared with direct reduction with the use of hydrogen. The presence of carbon monoxide has a favorable effect on the hydrogenation of unsaturated compounds under atmospheric pressure, especially in reactions where the hydrogenation of compounds with a carbon chain length of more than $C_{20}$ does not occur.

In the an exemplary method to obtain paraffinic hydrocarbons from natural fat, specifically from waste vegetable oils, animal fat or algal oils, the process is performed in two stages. The method is carried out in a coupled flow-type system, in atmospheric pressure conditions, in the presence of heterogeneous catalysts after such catalysts have been subject to thermal activation. In the exemplary method the catalysts are activated at a temperature of 450° C. in a stream of air for 1 hour. In Stage I the fat and/or waste fat is heated at a temperature of 100-500° C., in the presence of an inert gas, in the presence of a catalyst in the form of a metal oxide on an oxide support or in the form of a mixture of at least two metal oxides on an oxide support. Thereafter the product obtained in Stage I is treated, in the presence of an inert gas, at a temperature of 100-500° C., in the presence of a metallic catalyst on an oxide support, with hydrogen gas from a source 40 (shown in FIG. 2) or with a mixture of hydrogen and carbon monoxide, obtained by the selective decomposition of methanol.

The exemplary catalyst used in Stage I may be CoO, NiO, FeO, MoO, and the exemplary oxide support used is $SiO_2$, $Al_2O_3$, $TiO_2$, MgO, the aluminosilicate halloysite.

The catalyst used in may be Stage I a mixture of metal oxides, including two or three metal oxides, selected from the group comprising CoO, NiO, FeO, MoO, and the oxide support used is $SiO_2$, $Al_2O_3$, $TiO_2$, MgO, the aluminosilicate halloysite.

Stage I of the exemplary process may be carried out at a catalyst load of 0.5-20 $hr^{-1}$.

The inert gas used in exemplary Stage I may be argon or nitrogen.

In Stage II of the exemplary process, which is performed with the use of hydrogen gas, the catalysts which may be used are Pd, Ru, Pt, Rh, Co/Mo, Ni/Mo, Mo, W, Fe, and the oxide support used may be $SiO_2$, $Al_2O_3$, $TiO_2$, MgO, $ZrO_2$.

In Stage II of the exemplary process, which is performed with the use of a mixture of hydrogen and carbon monoxide, the catalyst used may be Pd, Ru, Pt, Rh, Co/Mo, Ni/Mo, Mo, W, Fe, Zr, and the oxide support used is $SiO_2$, $Al_2O_3$, $TiO_2$, MgO, $ZrO_2$.

Stage II of the exemplary process may be carried out at a catalyst load of 0.5-20 $hr^{-1}$.

The inert gas used in exemplary Stage II may be argon or nitrogen.

The selective decomposition of methanol may be carried out by subjecting anhydrous methanol to a reduction reaction in a coupled flow-type system, in atmospheric pressure conditions, at a temperature of 80-350° C., in the presence of an inert gas, over a heterogeneous catalyst in the form of a metal oxide on an oxide support.

The catalyst used in the exemplary method for the selective decomposition of methanol may be CoO, NiO, CuO, ZnO, FeO, MoO while the oxide support is $SiO_2$, $Al_2O_3$, $TiO_2$, MgO, the aluminosilicate halloysite.

The inert gas used in the exemplary method of methanol decomposition may be argon.

Methanol decomposition may be carried out in the exemplary method at a catalyst load of 0.5-20 $hr^{-1}$.

The exemplary methanol decomposition catalyst may be activated at a temperature of 450° C. in a stream of air for 1 hour.

The mixture of hydrogen and carbon monoxide from methanol decomposition may be used for reducing the reaction catalyst, in Stage II of the process, from its starting form to a metallic form. The presence of carbon monoxide prevents agglomeration of the active phase of the catalyst during its reduction.

In the process conducted according to an exemplary method, the starting raw material may be any kind of natural fat, including waste vegetable oils and waste animal fat from food processing, as well as algal oils containing triglycerides and/or fatty free acids $C_6$-$C_{22}$, of which the sources may include rapeseed, palm, coconut, sunflower, soy, linseed, maize, or peanut oils, animal fat, poultry fat, marine fat, prehydrolyzed fats, i.e., rendering fat, oils from various species of algae, or combinations of two or more fats.

In the process conducted according to an exemplary method, a mixture of saturated and unsaturated aliphatic hydrocarbons, mainly $C_6$-$C_{18}$ (Fraction 1), is obtained in Stage I. In Stage II (hydrogenation stage) the hydrogenation of the olefins contained in Fraction 1 takes place. As a result, a mixture of synthetic hydrocarbons which is enriched with saturated hydrocarbons (Fraction 2) is formed, mainly $C_6$-$C_{18}$ and contains the particularly desirable $C_{12}$-$C_{17}$ fraction. The obtained mixture of paraffinic hydrocarbons (Fraction 2 without olefins) may be used as an independent fuel or as a component of liquid fuels, mainly diesel, thus becoming an alternative fuel source. In Stage I of the process conducted by an exemplary method, products are formed mainly as the result of decarboxylation involving the fatty acids and/or triglycerides contained in the starting raw material. Other probable mechanisms of the formation of Fraction 1 include hydrodeoxygenation with hydrogen being formed in situ as well as catalytic cracking.

In the event of insufficient amount of paraffins obtained in Fraction 2, Stage II may be repeated by refluxing Fraction 2 to the reactor in Stage II of the process, thereby further enriching the hydrocarbon fraction in saturated hydrocarbons.

The green diesel formed in an exemplary embodiment (Fraction 2 without olefins) has the properties required for it to be used as diesel fuel or for mixing with petrochemical products, for instance those with lower cetane numbers. The cetane number may be controlled by selecting the appropriate heterogeneous catalyst and process conditions. Green diesel has the desirable lubricity, viscosity and density, and is useful in the diesel engines currently in use.

EXAMPLES

Exemplary embodiments utilizing the principals described herein are further illustrated by the following examples, which are set forth to illustrate the presently disclosed subject matter and are not to be construed as limiting.

An exemplary method is illustrated in the Examples. A feasible way to carry out Stage I in the process by an exemplary method is illustrated in Examples I-VII. Stage II is illustrated in Examples VIII-X, while Examples XI-XV illustrate a combination of the two stages of the process conducted by the exemplary method.

Stage I Examples

Example 1

Figure 1:
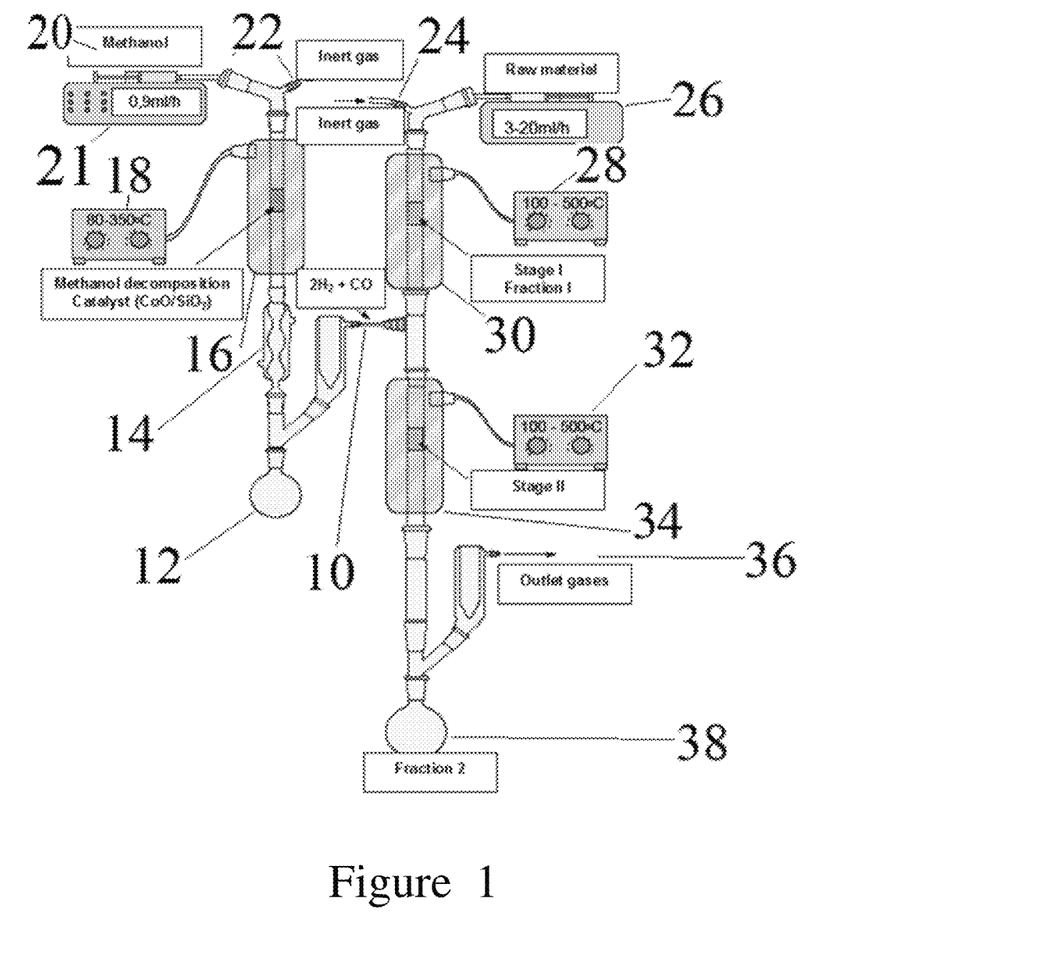
FIG. 1 is a schematic view of an exemplary system for obtaining paraffinnic hydrocarbons from natural fat using hydrogen from methanol decomposition (under atmospheric pressure conditions)

The process was conducted in an exemplary flow-type catalytic system, as shown in FIG. 1 (Stage I). The catalyst was thermally activated in the reaction chamber 30 under nitrogen from a source 24. The interior of the reaction chamber 30 was maintained by a heater controller 28 at a temperature of about 450° C. for 1 hour. The temperature was then lowered through operation of the heater controller to 100° C. The raw material, heated to 60° C., through operation of a heating device (not shown) was started to be fed in by a feeder 26 such as a pump (at 3 ml/hr) to the reaction chamber 30. The process temperature was gradually elevated to 500° C. and stage I products were sampled and subjected to a chromatographic analysis.

The catalyst used was 5% NiO+10% MoO/SiO$_2$ in the amount of 1 g obtained from a single solution of precursors. The raw material used was Category III rendering fat (a hydrolyzed waste animal fat, whose composition is given in wt % in Table 1—Sample I). The composition of the rendering fat may vary depending on the season of the year. Sample II was also used in the examples that follow.

TABLE 1

Composition of raw material Category III Rendering fat

| Compo- | | Content [wt %] | |
|---|---|---|---|
| sition* | Systematic name (customary name) | Sample I | Sample II |
| C14:0 | Tetradecanoic acid (myristic acid) | 2.4 | 1.7 |
| C16:0 | Hexadecanoic acid (palmitic acid) | 15.8 | 21.8 |
| C16:1 | 9-Hexadecenoic acid (palmitoleic acid) | 5.4 | 5.5 |

TABLE 1-continued

Composition of raw material Category III Rendering fat

| Compo- | | Content [wt %] | |
|---|---|---|---|
| sition* | Systematic name (customary name) | Sample I | Sample II |
| C17:0 | Heptadecanoic acid (margaric acid) | 0.8 | 1.1 |
| C18:0 | Octadecanoic acid (stearic acid) | 13.4 | 13.9 |
| C18:1 | 9-Octadecenoic acid (oleic acid) | 34.5 | 40.6 |
| C18:2 | (Z,Z)-9,12-Octadecadienoic acid (linoleic acid) | 9 | 10.3 |
| C18:3 | (Z,Z,Z)-9,12,15-Octadecatrienoic acid (linolenic acid) | 0.7 | 0 |
| alcohols | methanol | 5.4 | 0 |
|  | glycerin | 2.5 | 0 |
| other | esters, amides, other | 10.1 | 5.1 |

*The first number denotes the number of carbon atoms in a molecule, while the second the number of double bonds.

The compositions of the raw material [wt %] and fraction 1 [wt %] are given in Table 2.

TABLE 2

Content [wt %]; catalyst 5% NiO + 10% MoO/SiO$_2$

| Composition | Before reaction | Percentage in raw material | After reaction [500° C.] Fraction 1 | Percentage in product |
|---|---|---|---|---|
| C14:0 | 2.4 | 82 | — | 2.7 |
| C16:0 | 15.8 | | 1.3 | |
| C16:1 | 5.4 | | — | |
| C17:0 | 0.8 | | — | |
| C18:0 | 13.4 | | — | |
| C18:1 | 34.5 | | 1.4 | |
| C18:2 | 9 | | — | |
| C18:3 | 0.7 | | — | |
| methanol | 5.4 | 5.4 | — | 0 |
| glycerin | 2.5 | 2.5 | — | 0 |
| Saturated hydrocarbons C$_6$-C$_{18}$ (including C$_{12}$-C$_{17}$) | — | — | 38.3 (26.6) | 93.5 (60.8) |
| Unsaturated hydrocarbons C$_6$-C$_{18}$ (including C$_{12}$-C$_{17}$) | — | — | 55.2 (34.2) | |
| other | 10.1 | 10.1 | 3.8 (including other alcohols 2.4) | 3.8 |

As the above table describes, only 2.7% of C$_{14}$-C$_{18}$ fats remain, 93.5% included Saturated hydrocarbons C$_6$-C$_{18}$ (including C$_{12}$-C$_{17}$) and unsaturated hydrocarbons C$_6$-C$_{18}$ (including C$_{12}$-C$_{17}$).

Example 2

The process was conducted as in Example 1. The catalyst used was 10% NiO+10% MoO/SiO$_2$ in the amount of 1 g obtained from a single solution of precursors, and the raw material was Category III rendering fat, whose composition in wt % is given in Table 1—sample II).

The compositions of the raw material [wt %] and fraction 1 [wt %] are given in Table 3.

TABLE 3

Content [wt %]; catalyst 10% NiO + 10% MoO/SiO$_2$

| Composition | Before reaction | Percentage in raw material | After reaction [500° C.] Fraction 1 | Percentage in product |
|---|---|---|---|---|
| C14:0 | 1.7 | 94.9 | — | 2.2 |
| C16:0 | 21.8 | | 0.3 | |
| C16:1 | 5.5 | | — | |
| C17:0 | 1.1 | | — | |
| C18:0 | 13.9 | | 0.8 | |
| C18:1 | 40.6 | | 1.1 | |
| C18:2 | 10.3 | | — | |
| Saturated hydrocarbons $C_6$—$C_{17}$ (including $C_{12}$—$C_{17}$) | — | — | 29.4 (26.5) | 72.8 (55.4) |
| Unsaturated hydrocarbons $C_6$—$C_{17}$ (including $C_{12}$—$C_{17}$) | — | — | 43.4 (28.9) | |
| other | 5.1 | 5.1 | 25 (mainly benzene derivatives) | 25 |

Example 3

The process was conducted as in Example 1. The catalyst used was 10% NiO/SiO$_2$ in the amount of 1 g and the raw material was Category III rendering fat, whose composition in wt % is given in Table 1—sample I).

The compositions of the raw material [wt %] and fraction 1 [wt %] are given in Table 4.

TABLE 4

Content [wt %]; catalyst 10% NiO/SiO$_2$

| Composition | Before reaction | Percentage in raw material | After reaction [500° C.] Fraction 1 | Percentage in product |
|---|---|---|---|---|
| C14:0 | 2.4 | 82 | 1.6 | 14.1 |
| C16:0 | 15.8 | | 5.3 | |
| C16:1 | 5.4 | | 0.7 | |
| C17:0 | 0.8 | | — | |
| C18:0 | 13.4 | | 1.8 | |
| C18:1 | 34.5 | | 4.7 | |
| C18:2 | 9 | | — | |
| C18:3 | 0.7 | | — | |
| methanol | 5.4 | 5.4 | — | 0 |
| glycerin | 2.5 | 2.5 | — | 0 |
| Saturated hydrocarbons $C_6$—$C_{18}$ (including $C_{12}$—$C_{17}$) | — | — | 33.8 (23.6) | 77.2 (45.4) |
| Unsaturated hydrocarbons $C_6$—$C_{18}$ (including $C_{12}$—$C_{17}$) | — | — | 43.4 (21.8) | |
| other | 10.1 | 10.1 | 8.7 (including 1.4 ketones $C_{17}$, 2.9 acids $C_7$-$C_{10}$) | 8.7 |

Example 4

The process was conducted as in Example 4, at a temperature of about 400° C. The catalyst used was 5% MoO/5% CoO/SiO$_2$ in the amount of 1 g obtained by impregnation, and the raw material was Category III rendering fat, whose composition in wt % is given in Table 1—sample II).

The compositions of the raw material [wt %] and fraction 1 [wt %] are given in Table 5.

TABLE 5

Content [wt %]; catalyst 5% MoO/5% CoO/SiO$_2$

| Composition | Before reaction | Percentage in raw material | After reaction [400° C.] Fraction 1 | Percentage in product |
|---|---|---|---|---|
| C14:0 | 1.7 | 94.9 | — | 3.2 |
| C16:0 | 21.8 | | 1.5 | |
| C16:1 | 5.5 | | — | |
| C17:0 | 1.1 | | — | |
| C18:0 | 13.9 | | 1.7 | |
| C18:1 | 40.6 | | — | |
| C18:2 | 18.3 | | — | |
| Saturated hydrocarbons $C_6$—$C_{17}$ (including $C_{12}$—$C_{17}$) | — | — | 49.3 (43.1) | 87.3 (74.4) |
| Unsaturated hydrocarbons $C_6$—$C_{17}$ (including $C_{12}$—$C_{17}$) | — | — | 38 (31.3) | |
| other | 5.1 | 5.1 | 9.5 (including 3 ketones, 1.6 esters) | 9.5 |

Example 5

The process was conducted as in Example 1, at a process temperature of about 400° C. The catalyst used was 5% MoO/10% CoO/SiO$_2$ in the amount of 1 g obtained by impregnation, and the raw material was Category III rendering fat, whose composition in wt % is given in Table 1—sample II.

The compositions of the raw material [wt %] and fraction 1 [wt %] are given in Table 6.

TABLE 6

Content [% wag]; catalyst 5% MoO/10% CoO/SiO$_2$

| Composition | Before reaction | Percentage in raw material | After reaction [400° C.] Fraction 1 | Percentage in product |
|---|---|---|---|---|
| C14:0 | 1.7 | 94.9 | — | 0 |
| C16:0 | 21.8 | | — | |
| C16:1 | 5.5 | | — | |
| C17:0 | 1.1 | | — | |
| C18:0 | 13.9 | | — | |
| C18:1 | 40.6 | | — | |
| C18:2 | 18.3 | | — | |
| Saturated hydrocarbons $C_6$—$C_{17}$ (including $C_{12}$—$C_{17}$) | — | — | 53.1 (41.1) | 93.5 (68.6) |
| Unsaturated hydrocarbons $C_6$—$C_{17}$ (including $C_{12}$—$C_{17}$) | — | — | 40.4 (27.5) | |
| other | 5.1 | 5.1 | 6.5 (including 5.2 ketones) | 6.5 |

Example 6

The process was conducted as in Example 1 at a temperature of about 440° C. The catalyst used was 5% MoO/10% CoO/SiO$_2$ obtained by impregnation, in the amount of 6 g, and the raw material was Category III rendering fat, whose composition in wt % is given in Table 1—sample II).
The compositions of the raw material [wt %] and fraction 1 [wt %] are given in Table 7.

TABLE 7

Content [wt %]; catalyst 5% MoO/10% CoO/SiO$_2$

| Composition | Before reaction | Percentage in raw material | After reaction [440° C.] Fraction 1 | Percentage in product |
|---|---|---|---|---|
| C14:0 | 1.7 | 94.9 | — | 3.3 |
| C16:0 | 21.8 | | 2.4 | |
| C16:1 | 5.5 | | — | |
| C17:0 | 1.1 | | — | |
| C18:0 | 13.9 | | 0.9 | |
| C18:1 | 40.6 | | — | |
| C18:2 | 18.3 | | — | |
| Saturated hydrocarbons C$_6$—C$_{17}$ (including C$_{12}$—C$_{17}$) | — | — | 43.1 (34.8) | 86.8 (65) |
| Unsaturated hydrocarbons C$_6$—C$_{17}$ (including C$_{12}$—C$_{17}$) | — | — | 43.7 (30.2) | |
| other | 5.1 | 5.1 | 9.9 (including 6.1 ketones, 1.5 aldehydes) | 9.9 |

Example 7

The process was conducted as in Example 1, at a temperature of about 400° C. The catalyst used was 5% CoO/5% MoO/SiO$_2$ in the amount of 1 g obtained by dry impregnation, and the raw material was Category III rendering fat, whose composition in wt % is given in Table 1—sample II).

The compositions of the raw material [wt %] and fraction 1 [wt %] are given in Table 8.

TABLE 8

Content [wt %]; katalizator 5% CoO/5% MoO/SiO$_2$

| Composition | Before reaction | Percentage in raw material | After reaction [400° C.] Fraction 1 | Percentage in product |
|---|---|---|---|---|
| C14:0 | 1.7 | 94.9 | — | 3 |
| C16:0 | 21.8 | | 1.1 | |
| C16:1 | 5.5 | | — | |
| C17:0 | 1.1 | | — | |
| C18:0 | 13.9 | | — | |
| C18:1 | 40.6 | | 1.9 | |
| C18:2 | 18.3 | | — | |
| Saturated hydrocarbons C$_6$—C$_{17}$ (including C$_{12}$—C$_{17}$) | — | — | 49.2 (42.0) | 87.4 (73.1) |
| Unsaturated hydrocarbons C$_6$—C$_{17}$ (including C$_{12}$—C$_{17}$) | — | — | 38.2 (31.1) | |
| other | 5.1 | 5.1 | 9.6 (including 3.5 ketones, 0.7 esters) | 9.6 |

Stage II Examples

Hydrogenation of the Olefins Contained in Fraction 1 from Stage 1 to Fraction 2

The process of reduction of the olefins contained in Fraction 1 from Stage 1 is illustrated in the examples.

Example 8

The process was conducted in a flow-type, coupled catalytic system, composed of a methanol decomposition system and a Fraction 1 hydrogenation system, as shown in, FIG. 1 (Stage II). The catalyst used for methanol decomposition was CoO/SiO$_2$ in the amount of 0.5 g, and the catalyst in Stage II was PdCl$_2$/Al$_2$O$_3$ in the amount of 0.5 g. Methanol was obtained from a source such as a vessel 20. The catalyst in the methanol decomposition reaction was initially activated thermally in the reaction chamber 16 in a stream of air at a temperature of about 450° C. for 1 hour. The interior of the reaction chamber 16 was maintained by a heater controller 18 at a temperature of about 450° C. for 1 hour. The temperature in the methanol decomposition reactor 16 was then lowered to 100° C. through operation of the heater controller 18, the stream of carrier gas was switched to argon through appropriate valving 22, and then anhydrous methanol was fed in through operation of a feeder 21. The catalyst load was 10 h$^{-1}$. Methanol decomposition products were passed directly through a condenser 14 to the Stage II reactor 34 via a connection 10 wherein the gaseous methanol decomposition products are contacted by the Stage II catalyst. Impurities from the reaction were contained in a bottom flask 12. The catalyst in the Stage II reaction was initially activated thermally in the reaction chamber 34 in a stream of air at a temperature of about 450° C. for 1 hour. Then temperature in the reaction vessel 34 was then lowered to 100° C. through operation of the heater controller 32. The stage II catalyst reduces the active phase within 1 hour to the metal (Pd), at a temperature of about 450° C. Temperature in the catalytic bed in Stage II was then lowered to 100° C.

The raw material from Fraction 1 from Example 6 was fed into reaction chamber 34. The catalyst load was 1.5 h$^{-1}$. Temperature in Stage II was gradually elevated to 300° C. through operation of the heater controller 32 and products contained in bottom flask 38 were analyzed by chromatographic analysis. Additional outlet gases are released through an outlet 36.

The compositions of fraction 1 [wt %] and fraction 2 [wt %] are given in Table 9.

TABLE 9

| Composition | Fraction 1 from Example VI [440° C.] | Fraction 2 [300° C.] |
|---|---|---|
| C14:0 | — | — |
| C16:0 | 2.4 | 0.9 |
| C16:1 | — | — |
| C17:0 | — | — |
| C18:0 | 0.9 | — |
| C18:1 | — | — |
| C18:2 | — | — |
| C18:3 | — | — |
| Saturated hydrocarbons C$_6$—C$_{17}$ (including C$_{12}$—C$_{17}$) | 43.1 (34.8) | 79 (60.5) |
| Unsaturated hydrocarbons C$_6$—C$_{17}$ (including C$_{12}$—C$_{17}$) | 43.7 (30.2) | 7.5 (3.6) |
| other | 9.9 | 12.6 (including esters) |

Example 9

The process was conducted as in Example 8, at a temperature of about 400° C. The catalyst used for Stage II was H$_2$PtCl$_6$/Al$_2$O$_3$ in the amount of 0.5 g, and the product from Example 6 was used as Fraction 1.

The compositions of fraction 1 [wt %] and fraction 2 [wt %] are given in Table 10.

TABLE 10

| Composition | Fraction 1 from Example VI [440° C.] | Fraction 2 [400° C.] |
|---|---|---|
| C14:0 | — | — |
| C16:0 | 2.4 | — |
| C16:1 | — | — |
| C17:0 | — | — |
| C18:0 | 0.9 | — |
| C18:1 | — | — |
| C18:2 | — | — |
| C18:3 | — | — |
| Saturated hydrocarbons $C_6$—$C_{17}$ (including $C_{12}$—$C_{17}$) | 43.1 (34.8) | 76.7 (57) |
| Unsaturated hydrocarbons $C_6$—$C_{17}$ (including $C_{12}$—$C_{17}$) | 43.7 (30.2) | 8.6 (5.4) |
| other | 9.9 | 14.7 (including esters) |

Example 10

Figure 2:
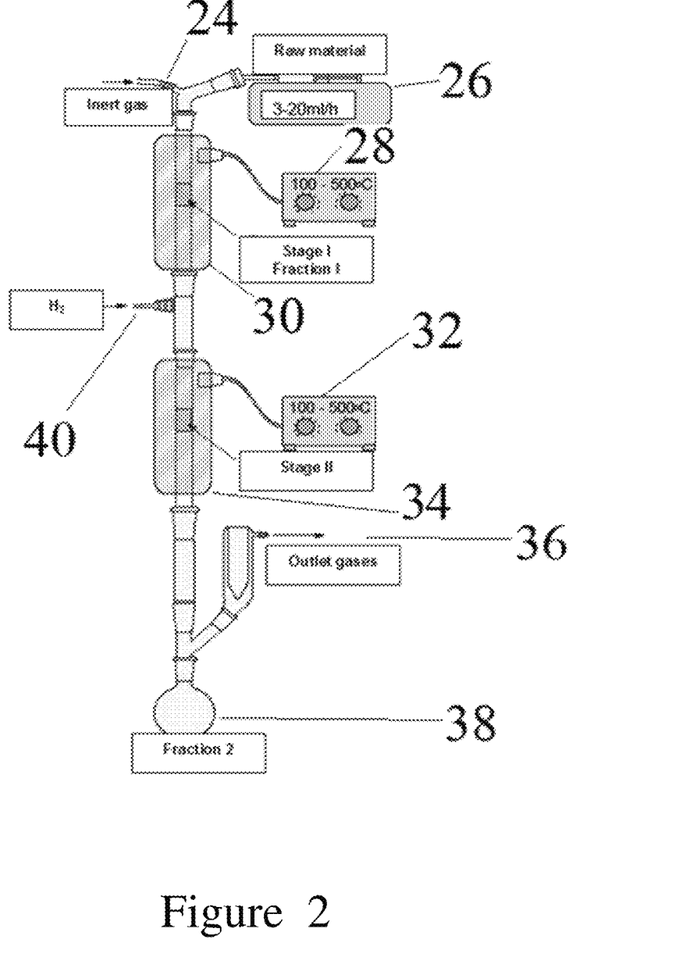
FIG. 2 is a schematic view of an exemplary system for obtaining paraffinnic hydrocarbons from natural fat using hydrogen gas (under atmospheric pressure conditions).

The process was conducted in a single-stage flow-type catalytic system, composed of a glass reactor, as shown in the FIG. 2 (Stage II). The catalyst was $PdCl_2/Al_2O_3$, used in the amount of 0.5 g and the process was conducted using compressed hydrogen. At the beginning, the catalyst was thermally activated in a stream of air at a temperature of about 450° C. for 1 hour, then the active phase was reduced for 1 hour to the metal (Pd), at a temperature of about 450° C., using a compressed hydrogen fed directly to the Stage II reactor. The temperature in the catalytic bed was then lowered to 100° C. and the raw material (Fraction 1 from Example 6) was fed in. The catalyst load was 1.5 $h^{-1}$. Temperature in Stage II was gradually elevated to 300° C. and products were analyzed by chromatographic analysis.

The compositions of fraction 1 [wt %] and fraction 2 [wt %] are given in Table 11.

TABLE 11

| Composition | Fraction 1 from Example VI [440° C.] | Fraction 2 [300° C.] |
|---|---|---|
| C14:0 | — | — |
| C16:0 | 2.4 | 0.3 |
| C16:1 | — | — |
| C17:0 | — | — |
| C18:0 | 0.9 | — |
| C18:1 | — | — |
| C18:2 | — | — |
| C18:3 | — | — |
| Saturated hydrocarbons $C_6$—$C_{17}$ (including $C_{12}$—$C_{17}$) | 43.1 (34.8) | 79.5 (59.0) |
| Unsaturated hydrocarbons $C_6$—$C_{17}$ (including $C_{12}$—$C_{17}$) | 43.7 (30.2) | 5.8 (3.4) |
| other | 9.9 | 14.4 (including esters) |

Stage I and Stage II Combined Examples

A double-stage process including Stages I and II is illustrated in the following Examples.

Example 11

The process was conducted in a flow-type catalytic system shown in the FIG. 1 (Stage I and II). At the beginning, the catalysts of both stages were initially activated thermally (I—5% $MoO/10\%$ $CoO/SiO_2$ in the amount of 9 g, II—10% $ZrO_2/Al_2O_3$ in the amount of 4 g), obtained by impregnation in a stream of argon at a temperature of about 450° C. for 1 hour. Then the Stage II catalyst was reduced from its original form to its metallic form using hydrogen from the decomposition of anhydrous methanol (350° C., catalyst 10% $CoO/SiO_2$) at a temperature of about 450° C. for 1 hour, which was fed at a rate of 0.9 ml/hr. The temperature in the Stage I and Stage II reactors was lowered to 100° C. and the raw material was fed in preheating to a temperature of 60° C. at the rate of 10 ml/hr. The raw material was Category III rendering fat, Sample II. The temperature in both Stages was gradually elevated to about 440° C. (Stage I) and 300° C. (Stage II), respectively, and after a stable condition was reached (about 1 hr) the major product (Fraction 2) was collected.

In Fraction 2 (at a 99% conversion), only saturated hydrocarbons $C_6$-$C_{17}$ (including $C_{12}$-$C_{17}$) in the amount of 85% (80%), respectively, and esters in the amount of 15% were obtained.

Example 12

The process was conducted as in Example 11, the temperature used in Stage II was about 400° C. The raw material used was a waste refined rapeseed oil of the following composition: C16:0 (10%), C18:0 (1.1%), C18:1 (46%), C18:2 (13%), C18:3 (4.5%), other (25.4%). The catalyst in Stage II was 10% $Pd/Al_2O_3$. In Fraction 2 (at a 100% conversion) the following hydrocarbons were obtained: saturated $C_6$-$C_{18}$ (including $C_{12}$-$C_{17}$) 85% (66%) respectively, unsaturated $C_6$-$C_{18}$ (including $C_{12}$-$C_{17}$), 7.2% (6%) respectively, and other products—7.8% (mainly esters and alcohols).

Example 13

The process was conducted as in Example 11, the temperature in Stage II was about 500° C. The raw material used was waste animal fat (pork lard) of the following composition: C14:0 (3%), C16:0 (30%), C18:0 (15%), C18:1 (45%), C18:2 (5%), other (2%). The catalyst in Stage II was 10% $Pd/Al_2O_3$. In fraction 2 (at a 100% conversion) the following hydrocarbons were obtained: saturated $C_6$-$C_{18}$ (including $C_{12}$-$C_{17}$) 80% (63%) respectively, unsaturated $C_6$-$C_{18}$ (including $C_{12}$-$C_{17}$) 8% (3%) respectively, and other products—12% (mainly esters and alcohols).

Example 14

The process was conducted as in Example 11. The raw material used was a mixture of palmitic acid C16:0 and stearic acid C18:0 as a composition model of an algal oil after pyrolysis (*Chlorella* sp.) at a molar ratio of C16:0 to C18:0 of 1:0.7, respectively. The catalyst in Stage II was 10% $Pd/Al_2O_3$. In fraction 2, saturated $C_{15}$ and $C_{17}$ hydrocarbons were obtained with a yield of 75%.

Example 15

The process was conducted as in Example 11. The catalyst used in Stage II was 10% $Pd/Al_2O_3$. The raw material used was a waste hydrolyzed poultry fat of the following composition: C14:0 (1%), C16:0 (24%), C16:1 (6%), C18:0 (8%), C18:1 (29%), C18:2 (22%), other (10%). The catalyst used in Stage II was 10% $Pd/Al_2O_3$. In fraction 2 (at a 100% conversion) the following hydrocarbons were obtained: saturated $C_6$-$C_{17}$ (including $C_{12}$-$C_{17}$) 85% (65%) respectively, unsaturated $C_6$-$C_{17}$ (including $C_{12}$-$C_{17}$) 5% (2%) respectively, and other products—10% (mainly esters).

Of course these methods are exemplary and alterations thereto are possible by those having skill in the relevant technology.

Thus the example embodiments and arrangements achieve improved capabilities, eliminate difficulties encountered in the use of prior methods and systems, and attain the desirable results described herein.

In the foregoing description, certain terms have been used for brevity, clarity and understanding. However, no unnecessary limitations are to be implied therefrom because such terms are used for descriptive purposes and are intended to be broadly construed.

Moreover the descriptions and illustrations herein are by way of examples and the inventive scope is not limited to the features shown and described.

Further, it should be understood that features and/or relationships associated with one embodiment can be combined with features and/or relationships from other embodiments. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are utilized and carried out, and the advantages and useful results attained, the new and useful arrangements, combinations, methodologies, structures, devices, elements, combinations, operations, processes and relationships are set forth in the appended claims.

We claim:

1. A method of obtaining paraffinic hydrocarbons from natural fat, from waste vegetable oils, animal fat or algal oils, in a coupled flow reactor, under atmospheric pressure conditions, in the presence of heterogeneous catalysts, in two stages comprising;

in a stage I;
   (a) activating at least one catalyst including at least one metal oxide on at least one oxide support by thermal activation at about 450° C. for about 1 hour,
   (b) heating fat derived from at least one of vegetable oil, animal fat and algal oil, to a temperature range of 100-500° C., in the presence of an inert gas,
   (c) reacting the fat of step (b) by heating in the presence of the activated catalyst of step (a),
   (d) whereby a stage I product is produced through step (c), in a stage II;
   (e) reacting the stage I product of step (d) in the presence of an inert gas, at a temperature in a range of 100-500° C., and in the presence of a metallic catalyst on an oxide support, with hydrogen gas or with a mixture of hydrogen and carbon monoxide,
   (f) whereby through step (e) a stage II product is produced and a paraffin product is obtained, and further comprising:
   (g) prior to step (e), decomposing selectively methanol by subjecting anhydrous methanol to a reduction reaction in a coupled system, under atmospheric pressure conditions, at a temperature in a range of 80-350° C., in the presence of an inert gas, and a heterogeneous catalyst in the form of a metal oxide on an oxide support, to produce the hydrogen gas or mixture of hydrogen gas and carbon monoxide reacted in step (e).

2. The method of claim 1, wherein the catalyst activated in step (a) and used in step (c) of Stage I comprises at least one of CoO, NiO, FeO and MoO, and the oxide support comprises at least one of $SiO_2$, $Al_2O_3$, $TiO_2$, MgO and aluminosilicate halloysite.

3. The method of claim 1, wherein the catalyst activated in step (a) and used in step (c) of Stage I comprises a mixture of metal oxides, selected from the group comprising: CoO, NiO, FeO and MoO, and the oxide support comprises $SiO_2$, $Al_2O_3$, $TiO_2$, MgO and aluminosilicate halloysite.

4. The method of claim 1, wherein in step (c) the catalyst operates at a load of 0.5-20 $hr^{-1}$.

5. The method of claim 1, wherein in step (b) the inert gas comprises at least one of argon and nitrogen.

6. The method of claim 1, wherein in step (e) when hydrogen gas is used, the catalyst comprises at least one of Pd, Ru, Pt, Rh, Co/Mo, Ni/Mo, Mo, W and Fe, and the oxide support comprises at least one of $SiO_2$, $Al_2O_3$, $TiO_2$, MgO and $ZrO_2$.

7. The method of claim 1, wherein in step (e), when a mixture of hydrogen and carbon monoxide is used, the catalyst comprises at least one of Pd, Ru, Pt, Rh, Co/Mo, Ni/Mo, Mo, W, Fe and Zr, and the oxide support used is $SiO_2$, $Al_2O_3$, $TiO_2$, MgO and $ZrO_2$.

8. The method of claim 1, wherein in step (e) the inert gas comprises at least one of argon and nitrogen.

9. The method of claim 1, wherein in step (g) the catalyst used for selective decomposition of methanol comprises at least one of CoO, NiO, CuO, ZnO, FeO and MoO and the oxide support used comprises at least one of $SiO_2$, $Al_2O_3$, $TiO_2$, MgO, and aluminosilicate halloysite.

10. The method of claim 1, wherein the catalyst used for the selective decomposition of methanol is one of CoO, NiO, CuO, ZnO, FeO, and MoO and the oxide support used is one of $SiO_2$, $Al_2O_3$, $TiO_2$, MgO, and aluminosilicate halloysite.

11. The method of claim 1, wherein in step (g) the inert gas comprises argon.

12. The method of claim 1, wherein in step (g) the decomposition of methanol is performed at a catalyst load of 0.5-20 $hr^{-1}$.

13. The method of claim 1, and further comprises: prior to step (g) activating the heterogeneous catalyst for decomposition of methanol by heating at a temperature of about 450° C. for about 1 hour.

14. The method of claim 13, wherein in step (g) the catalyst is activated by heating in an air stream at a temperature of about 450° C. for about 1 hour.

15. The method of claim 1, wherein in step (a) the catalyst is activated by heating in a stream of air at a temperature of about 450° C. for about 1 hour.

16. The method of claim 1, wherein in step (e) the mixture of hydrogen and carbon monoxide reduces the reaction catalyst from its original form to a metallic form.

* * * * *